Figure 1:
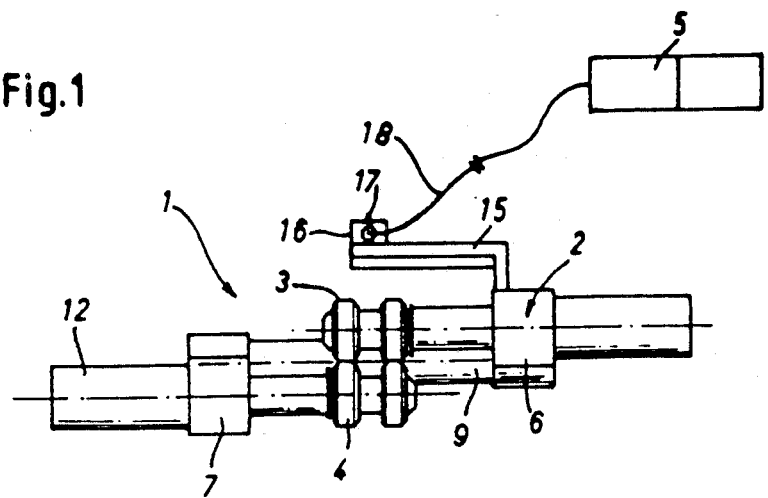

United States Patent

Neumüller et al.

[11] Patent Number: 4,655,872
[45] Date of Patent: Apr. 7, 1987

[54] WELDING APPARATUS WITH INTEGRAL FRAME ASSEMBLY

[76] Inventors: Walter Neumüller, Haupstrasse 71, A-2434 Mannersdorf; Friedrich Liebl, Corethgasse 25, A-2434 Gotzendorf, both of Austria

[21] Appl. No.: 792,031

[22] Filed: Oct. 28, 1985

[30] Foreign Application Priority Data

Nov. 13, 1984 [AT] Austria ................................ 3584/84

[51] Int. Cl.$^4$ ............................................ B32B 31/08
[52] U.S. Cl. ................................... 156/499; 156/157; 156/308.4; 156/309.9; 156/502; 156/583.4
[58] Field of Search .................... 100/93 RP; 156/157, 156/308.4, 309.9, 499, 502, 555, 583.4

[56] References Cited

U.S. PATENT DOCUMENTS 2,387,566 10/1945 Cüsters .......................... 156/555 X
3,166,458 1/1965 Chinn et al. ...................... 156/295
3,229,620 1/1966 Rogers et al. ................. 156/583.5 X

FOREIGN PATENT DOCUMENTS 9015 3/1980 European Pat. Off. ........... 156/499

Primary Examiner—Robert A. Dawson
Attorney, Agent, or Firm—Kurt Kelman

[57] ABSTRACT

A welding apparatus for welding together overlapping ends of two lengths of thermoplastic synthetic resin sheets at a welding station comprises a wedge-shaped heating device for softening the thermoplastic synthetic resin along the overlapping sheet ends, the heating device being arranged ahead of the welding station in an operating direction and being displaceable in said direction. The apparatus has a frame including two parallel frame parts, a part connecting the two frame parts, the connecting part being rigidly affixed to one of the frame parts and the other frame part being pivotally mounted on the connecting part, and spring steel rods biasing the other frame part for pivoting towards the one frame part. Two oppositely disposed, motor-driven pressure rollers are pressable against each other, one of the rollers being mounted on the one frame part and the other roller being mounted on the other frame part.

7 Claims, 4 Drawing Figures

WELDING APPARATUS WITH INTEGRAL FRAME ASSEMBLY

The present invention relates to improvements in a welding apparatus for welding together overlapping ends of two lengths of thermoplastic synthetic resin sheets at a welding station, which comprises a wedge-shaped heating device for softening the thermoplastic synthetic resin along the overlapping sheet ends, the heating device being arranged ahead of the welding station in an operating direction and being displaceable in this direction, a frame and two oppositely disposed, motor-driven pressure rollers pressable against each other.

A known welding apparatus of this type comprises an elongated frame equipped with a drive motor and carrying two bell crank levers on which upper welding rollers are mounted. Two lower welding rollers are arranged on the elongated frame opposite the upper welding rollers. Pressure rollers are arranged downstream of the welding rollers in an operating direction and a leaf spring holds the pressure rollers under tension. A wedge-shaped contact heating body is longitudinally displaceably arranged between the pressure rollers for heating the two sheets of thermoplastic synthetic resin along two parallel lines to the softening temperature required for welding. Furthermore, support rollers mount the ends of the frame on the lower synthetic resin sheet. Two pinions transmit the drive of the motor to respective chain drives, one of the chain drives driving the lower welding rollers by means of three drive shafts and bevel gears. The upper welding rollers are driven by the second chain drive. This apparatus has a rather complex structure and is quite heavy.

It is the primary object of this invention to overcome these disadvantages in such a welding apparatus and to provide a very simple structure therefor.

The above and other objects are accomplished in a welding apparatus of the indicated type according to the invention with a frame which includes two parallel frame parts, a part connecting the two frame parts, the connecting part being rigidly affixed to one of the frame parts and the other frame part being pivotally mounted on the connecting part, and a spring steel rods biasing the other frame part for pivoting towards the one frame part. Two oppositely disposed, motor-driven pressure rollers are pressable against each other one of the rollers being mounted on the one frame part and the other roller being mounted on the other frame part.

Such a frame may be manufactured very economically and is relatively light so that the resultant welding apparatus may be used for welding together sealing sheets, particularly in tunnels, by operating the apparatus as a self-propelled welding device. The spring means imparts to the pivotal frame part an exactly defined and adjustable bias so that the pressure roller mounted thereon will be pressed against the opposite roller under a pressure assuring a uniform welding seam.

Figure 2:
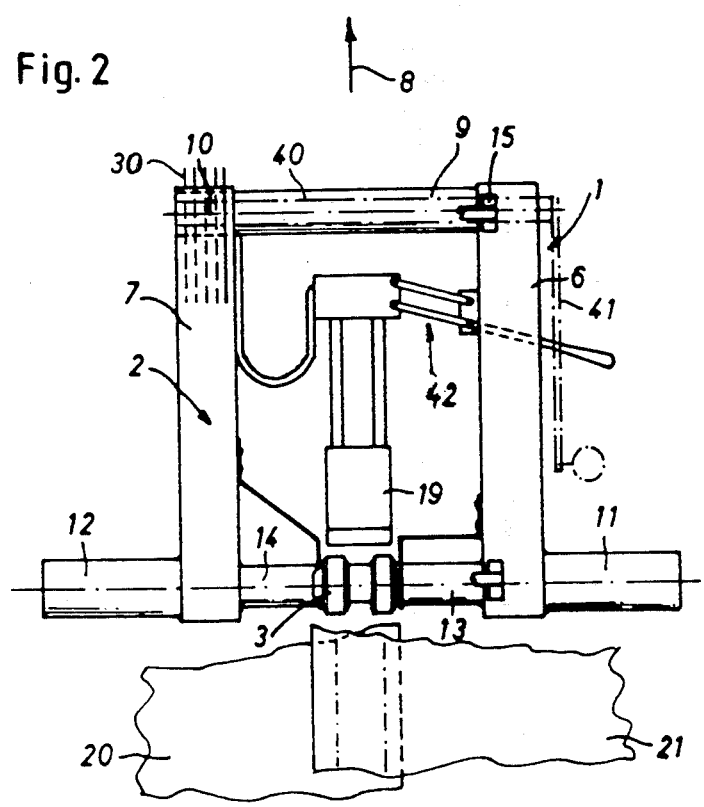
Figure 3:
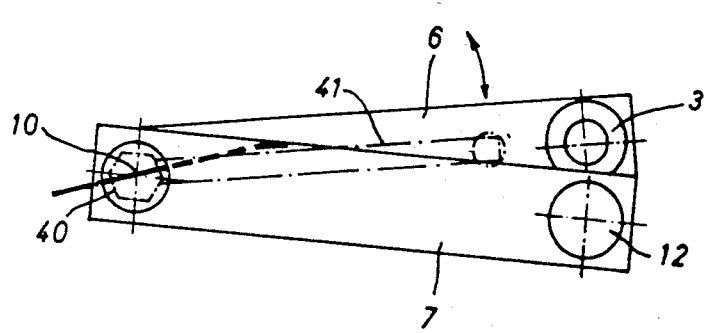
Figure 4:
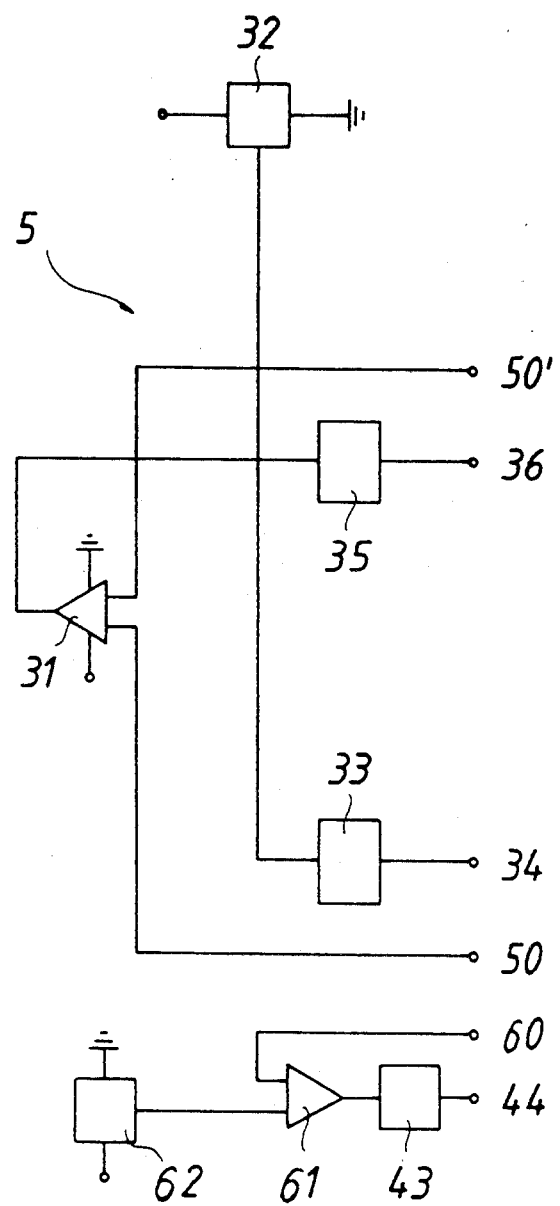

The above and other objects, features and advantages of the present invention will become more apparent from the following detailed description of a now preferred embodiment thereof, taken in conjunction with the accompanying drawing wherein FIG. 1 is a generally schematic front elevation of the welding apparatus, FIG. 2 is a top view of FIG. 1, FIG. 3 is an enlarged side elevation of the frame, and FIG. 4 is a circuit diagram of the control.

A welding apparatus of the general type in connection with which the present invention is specifically described and illustrated has been disclosed in our co-pending application Ser. No. 779,078, filed Sept. 23, 1985, whose disclosure is incorporated herein by reference.

Referring now to the drawings, welding apparatus 1 for welding together overlapping parallel ends of two lengths of thermoplastic synthetic resin sheets 20, 21 at a welding station in the path of the sheet ends is shown to comprise a frame 2 movable in an operating direction indicated by arrow 8 in FIG. 2. A heating device 19 for softening the thermoplastic synthetic resin along the sheet ends is arranged on the frame ahead of the welding station and is displaceable in the operating direction. Two oppositely disposed, upper and lower pressure rollers 3, 4 are arranged on the frame trailing the heating device and are pressable against each other. A separate motor 11, 12 is associated with each pressure roller for driving the rollers about respective axes thereof, and an adjustable control 5 is connected to the motors for synchronously driving the rollers.

Motors 11, 12 comprise rotors having respective axes and the roller axes extend coaxial to the rotor axes of the associated motors driving the respective rollers. Planetary gearings 13, 14 are arranged between pressure rollers 3, 4 and associated motors 11, 12. This provides a particularly simple structure and the planetary gearings provide a reduction of the rotary speed and thus produce a favorable torque.

Frame 2 includes two parallel frame parts 6, 7 extending in the operating direction and transversely to a longitudinal axis of respective motors 11,12, each frame part supporting the respective motor at a trailing end thereof, and part 9 connecting the leading ends of the two frame parts opposite to the trailing ends, the connecting part being a transversely extending tube. Connecting tube part 9 is rigidly affixed to frame part 6 and frame part 7 is pivotally mounted on connecting part 9 for rotation of frame part 7 relative to frame part 6 about longitudinal axis 10 of connecting part 9 extending parallel to the longitudinal motor axes. Spring steel rods 30 bias frame part 7 for pivoting towards frame part 6. Two oppositely disposed, motor-driven pressure rollers 3, 4 are pressable against each other, one of the rollers being mounted on the one frame part and the other roller being mounted on the other frame part. Each pressure roller is illustrated as comprising two spaced rubber wheels for producing a double welding seam. However, if only a single welding seam is desired, the pressure rollers may comprise a sole rubber wheel and, on the other hand, if more than two welding seams are desired, a corresponding number of rubber wheels may be provided.

Two brackets 15 (only fragmentarily shown in FIG. 2 for the sake of clarity) support handle 16 on frame portion 6 and control switch 17 is mounted on the handle. Control lines 18 lead from control 5 to control switch 17 and from the control switch through tubular bracket 15 to motors 11, 12 and to centrally arranged heating device 19. The heating device is wedge-shaped and parallelogram guide 42 mounts the heating device on frame part 6 to enable the heating device to be displaced in the operating direction and parallel thereto. If desired, the guide for the heating device may be constituted by a suitable dove-tailed or circular guide track in frame part 6.

FIG. 3 further illustrates frame 2. It shows tubular connecting part 9 in transverse cross section and frame part 7 pivotally mounted thereon for rotation about longitudinal axis 10. Connecting part tube 9 defines a plurality of adjacent bores extending transversely to the direction of the longitudinal axis and receiving spring steel rods 30 each having one end disposed in the bores. The other steel rod ends engaging the frame part 7, this frame part being hollow and the other steel rod ends extending thereinto for engagement therewith. Frame part 7 and spring steel rods 30 have respective longitudinal axes, the longitudinal axes of the spring steel rods enclosing an angle of 15° to 30° with the longitudinal axis of the other frame part. This arrangement not only facilitates the pushing of the one steel rod ends into the bores in connecting part 9 and the clamping of these steel rod ends therein whereby any gliding of the steel rods out of frame part 7 is avoided when the spring bias pressure is reduced. Since the other steel rod ends are somewhat elastically deformed by their engagement with the interior wall of hollow frame part, a torque is produced which biases pivotal frame part 7 with pressure roller 4 mounted thereon against pressure roller 3 mounted on frame part 6.

As shown in FIG. 2, in an operating position, spring steel rods 30 have a length to extend beyond an end of frame part 7 pivotally mounted on connecting part 9. In this way, a desired number of steel rods may be removed simply, for example when it is desired to reduce the bias of the spring means for diminishing the pressure against the synthetic resin sheets, for example when thinner sheets are welded. In addition, this mounting of the steel rods enables their disposition to be readily controlled at all times. If the other steel rod ends engaging the interior wall of hollow frame part 7 are rounded, they may be readily pushed into the hollow frame part with a minimum of force and, in addition, scratching of the hollow frame part wall will be avoided.

FIGS. 2 and 3 illustrate in dash-dotted lines another preferred embodiment. They show pivotal lever part 40 mounted in connecting part tube 9, the pivotal lever part defining the bores receiving the one spring steel rod ends, and exteriorly mounted crank 41 attached to lever part 40 for regulating the bias of the spring steel rods. By pivoting crank 41 in the directions indicated by the double-headed arrow in FIG. 3, the pressure of roller 4 against roller 3 may be accurately adjusted to any desired bias.

The schematic circuit diagram of FIG. 4 illustrates adjustable control 5 for motors 11, 12. As shown, terminals 50, 50' of the control are connected to the rotational speed measuring means of the motors to receive the control signals therefrom, which indicate the rotational speed of each motor. A current source (not shown) is connected to the inputs of control circuit elements 33, 35 whose outputs are connected to terminals 34, 36 of electric current supply lines leading to motors 11, 12 to supply current to the motors. The control circuit elements may be transistors delivering current corresponding to the control signals to the motors. Control circuit element 33 is connected to setting circuit 32, which provides the desired value, and delivers a current of the desired value to the motor selected as guide motor while control circuit element 35 for the other motor is connected to the output of regulator 31, which changes the existing current value to the desired current value, the control signal of the rotational speed measuring means of the guide motor being delivered to one of the inputs of regulator 31 as the desired current value while the control signal of the rotational speed measuring means of the other motor is delivered to the other input of the regulator as the existing current value. The resultant output signal of regulator 31 delivers a control signal to the other motor whose value assures the synchronous rotation of the two motors by delivering the desired current value to the other motor through circuit control element 35.

Control 5 has a further terminal 60 which is connected to a temperature sensor (not shown) arranged in the range of heating device 19 and emitting a control signal corresponding to the sensed temperature. Terminal 60 is also connected to one of the inputs of regulator 61, which changes the existing value to the desired value, and second input of regulator 61 being connected to settling circuit 62, which provides the desired value. The output of regulator 61 is connected to control circuit element 43 to deliver thereto a control signal for regulating heating device 61 connected to terminal 44 which receives the control signal from control circuit element 43.

What is claimed is:

1. A welding apparatus for welding together overlapping ends of two lengths of thermoplastic synthetic resin sheets at a welding station, which comprises
   (a) a wedge-shaped heating device for softening the thermoplastic synthetic resin along the overlapping sheet ends, the heating device being arranged ahead of the welding station in an operating direction and being displaceable in said direction,
   (b) a frame comprised of
      (1) two parallel frame parts, each frame part having two ends and extending in a respective plane, the planes intersecting along a line defined by one of the ends of the two frame parts,
      (2) a part connecting the two frame parts, the connecting part being rigidly affixed to the one end of one of the frame parts and the one end of the other frame part being pivotally connected with the connecting part, the connecting part extending along said line, and
      (3) a spring means biasing the other frame part for pivoting towards the plane of the one frame part, and
   (c) two oppositely disposed, motor-driven pressure rollers pressable against each other by said spring means and having axes extending parallel to the connecting part, one of the rollers being mounted on the other end of the one frame part and the other roller being mounted on the other end of the other frame part.

2. The welding apparatus of claim 1, wherein the connecting part is a tube.

3. The welding apparatus of claim 2, wherein the other frame part is hollow, and the spring means comprises a plurality of steel rods having two ends, one of the steel rod ends being engaged in bores in the connecting part and the other steel rod ends engaging the other frame part.

4. The welding apparatus of claim 3, wherein the other frame part and the spring steel rods have respective longitudinal axes, the longitudinal axes of the spring steel rods enclosing an angle of 15° to 30° with the longitudinal axis of the other frame part.

5. The welding apparatus of claim 3, wherein, in an operating position, the spring steel rods have a length to extend beyond an end of the other frame part pivotally mounted on the connecting part.

6. The welding apparatus of claim 3, wherein the other steel rod ends extend into the other hollow frame part and are rounded.

7. The welding apparatus of claim 3, further comprising a pivotal lever part mounted in the connecting part tube, the pivotal lever part defining the bores receiving the one spring steel rod ends, and an exteriorly mounted crank for regulating the bias of the spring steel rods.

* * * * *